US012632175B2

(12) United States Patent
Liu et al.

(10) Patent No.: US 12,632,175 B2
(45) Date of Patent: May 19, 2026

(54) STOCHASTIC RISK SCORING WITH COUNTERFACTUAL ANALYSIS FOR STORAGE CAPACITY

(71) Applicant: EMC IP Holding Company LLC, Hopkinton, MA (US)

(72) Inventors: Bing Liu, Tianjin (CN); Rahul Deo Vishwakarma, Kolkata (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 1184 days.

(21) Appl. No.: 17/178,504

(22) Filed: Feb. 18, 2021

(65) Prior Publication Data

US 2022/0261156 A1     Aug. 18, 2022

(51) Int. Cl.
*G06F 3/06* (2006.01)
*G06N 7/01* (2023.01)

(52) U.S. Cl.
CPC .......... *G06F 3/0608* (2013.01); *G06F 3/0652* (2013.01); *G06F 3/0673* (2013.01); *G06N 7/01* (2023.01)

(58) Field of Classification Search
CPC .... G06F 3/0608; G06F 3/0652; G06F 3/0673; G06F 3/0641; G06F 3/0653; G06N 7/01; G06N 5/022; G06N 20/00
See application file for complete search history.

(56) References Cited

U.S. PATENT DOCUMENTS

| | | |
|---|---|---|
| 11,281,577 B1 | 3/2022 | Karumbunathan et al. |
| 2014/0052907 A1* | 2/2014 | Starr ..................... G06F 3/0613 |
| | | 711/111 |
| 2019/0108888 A1 | 4/2019 | Sarkar et al. |
| 2019/0303368 A1* | 10/2019 | Liu ......................... G06N 20/00 |
| 2020/0192572 A1 | 6/2020 | Dwarampudi et al. |
| 2020/0349013 A1* | 11/2020 | Chang ................. G06F 11/1453 |
| 2021/0174258 A1 | 6/2021 | Wenchel et al. |
| 2021/0390457 A1 | 12/2021 | Romanowsky et al. |
| 2022/0091763 A1 | 3/2022 | Perneti et al. |
| 2022/0114494 A1 | 4/2022 | Sousa et al. |
| 2022/0230083 A1 | 7/2022 | Vishwakarma et al. |

OTHER PUBLICATIONS

J. Ren et al., "Archivist: A Machine Learning Assisted Data Placement Mechanism for Hybrid Storage Systems," 2019 IEEE 37th International Conference on Computer Design (ICCD), Abu Dhabi, United Arab Emirates, 2019, pp. 676-679, doi: 10.1109/ ICCD46524. 2019.00098. (Year: 2019).*

(Continued)

*Primary Examiner* — Michael H Hoang
(74) *Attorney, Agent, or Firm* — Workman Nydegger

(57) ABSTRACT

One example method includes accessing a dataset, selecting a list of parameters of the dataset, each of the parameters being selected based on a determination that the parameter is affecting a size of the dataset and/or affecting an amount of data storage space consumed by the dataset, performing a counterfactual analysis using the parameters, and using results of the counterfactual analysis to generate a recommendation that identifies one or more data protection actions which influence utilization of the data storage space, and modifying utilization of the data storage space by implementing one of the data protection actions.

18 Claims, 6 Drawing Sheets

(56) References Cited

OTHER PUBLICATIONS

Mahajan, Divyat, Chenhao Tan, and Amit Sharma. "Preserving Causal Constraints in Counterfactual Explanations for Machine Learning Classifiers." arXiv.org, Jun. 12, 2020. https://arxiv.org/abs/1912.03277. (Year: 2020).*

Jugovac, Michael, and Dietmar Jannach. "Interacting with recommenders-overview and research directions." ACM Transactions on Interactive Intelligent Systems (TiiS) 7.3 (2017): 1-46. https://dl.acm.org/doi/pdf/10.1145/3001837 (Year: 2017).*

Xia, Wen, et al. "A comprehensive study of the past, present, and future of data deduplication." Proceedings of the IEEE 104.9 (2016): 1681-1710. https://ieeexplore.ieee.org/stamp/stamp.jsp?tp=&arnumber=7529062 (Year: 2016).*

C. Vaughn et al., "Soothsayer: Predicting Capacity Usage in Backup Storage Systems," 2015 IEEE 23rd International Symposium on Modeling, Analysis, and Simulation of Computer and Telecommunication Systems, Atlanta, GA, USA, 2015, pp. 208-217, doi: 10.1109/MASCOTS.2015.40. (Year: 2015).

Kumar, Revathi Anil, and Mark Chamness. "Stochastic Estimated Risk for Storage Capacity." arXiv preprint arXiv:1901.10552 (2018), pp. 1-8 (Year: 2018).

Leopoldo Bertossi. "Score-Based Explanations in Data Management and Machine Learning" arXiv:2007.12799v2 (2020) (Year: 2020).

Lundberg, Scott M., and Su-In Lee. "A unified approach to interpreting model predictions." arXiv:1705.07874v2 (2017), pp. 1-10 (Year: 2017).

Lundberg, Scott, Welcome to the SHAP documentation, https://shap.readthedocs.io/en/latest/,, Jan. 20, 2021.

Simona Maggio, "Why Is My Data Drifting?", https://web.archive.org/web/20210112103447/https://blog.dataiku.com/why-is-my-data-drifting, The Wayback Machine Jan. 12, 2021, pp. 1-6 (Year: 2021).

Snow, Derek, Machine Learning in Asset Management (Jul. 16, 2019). JFDS: https://jfds.pm-research.com/content/2/1/10, http://dx.doi.org/10.2139/ssrn.3420952 (Year: 2019).

TomAF, "Computing SHAP Values from scratch", hhttps://web.archive.org/web/20191118011147/https://afiodorov.github.io/2019/05/20/shap-values-explained/, The Wayback Machine Nov. 18, 2019, pp. 1-9 (Year: 2019).

Wikipedia—Shapley Value, https://en.wikipedia.org/wiki/Shapley_value, Jan. 20, 2021.

* cited by examiner

Causal relationship DAG for attributes

| Elements | Attributes |
|---|---|
| Y | Storage Utilization (%) |
| X1 | Deduplication ratio (numeric) |
| X2 | total_post_compression_used (GB) |
| X3 | Daily precompression (GB) |
| X4 | Workload pattern (types) |
| Z1 | Snapshot deletion (GB) |
| Z2 | Data movement (GB) |
| Z3 | post_compression_used after space reclamation (GB) |
| Z4 | Space reclamation after garbage collection (GB) |

STOCHASTIC RISK SCORING WITH COUNTERFACTUAL ANALYSIS FOR STORAGE CAPACITY

RELATED APPLICATIONS

This application is related to U.S. patent application Ser. No. 17/153,294, filed Jan. 20, 2021, and entitled *STOCHASTIC RISK SCORING WITH COUNTERFACTUAL ANALYSIS FOR STORAGE CAPACITY* (the "'294 Application"). The '294 Application is incorporated herein in its entirety by this reference.

FIELD OF THE INVENTION

Embodiments of the present invention generally relate to data storage consumption. More particularly, at least some embodiments of the invention relate to systems, hardware, software, computer-readable media, and methods for recommending and implementing various actions concerning data storage assets, based on one or more counterfactual analyses.

BACKGROUND

Personnel such as computing system administrators have a need to keep track of storage capacity consumption so that they can make informed decisions which will help to ensure that the capacity of the storage assets is not exhausted before the administrator can take remedial actions. In a basic approach to storage capacity monitoring and analysis, the administrator may receive only an estimate as to when a storage asset or storage system storage is expected to be full. In this example, the administrator may be notified that a storage asset 'A' will be filled, that is, its storage capacity will be exhausted, on Feb. 1, 2022. With this information in hand, the administrator may be able to take some sort of data protection action to ensure that, for example, adequate space remains available for ongoing backup operations.

In some instances, a recommendation for particular data protection actions may be based purely on the outcome of a time series forecast, or based on a ML (machine learning)/statistical method that is used to estimate capacity growth, that is, a demand forecasting process. For example, one such approach may employ the following hypothetical rule based linear relationship to provide action, thus:

```
if storage is going to be 100% in next "N" day
  do
    {
       case 1: action-1 based on condition-1
         case 2: action-2 based on condition-2
       . . .
       case n: action-n based on condition-n
    }.
```

Approaches like this one however, are overly simplistic, at least insofar as they fail to account for the various factors that may impact overall data growth in a computing environment, such as a backup ecosystem for example. Such factors may include, for example, space reclamation after garbage collection, movement of data to cloud storage environment, and deduplication factors. The failure of approaches such as the example noted above to consider such factors, and other factors, may result in, among other things, the taking of poor decisions that can adversely affect a business.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
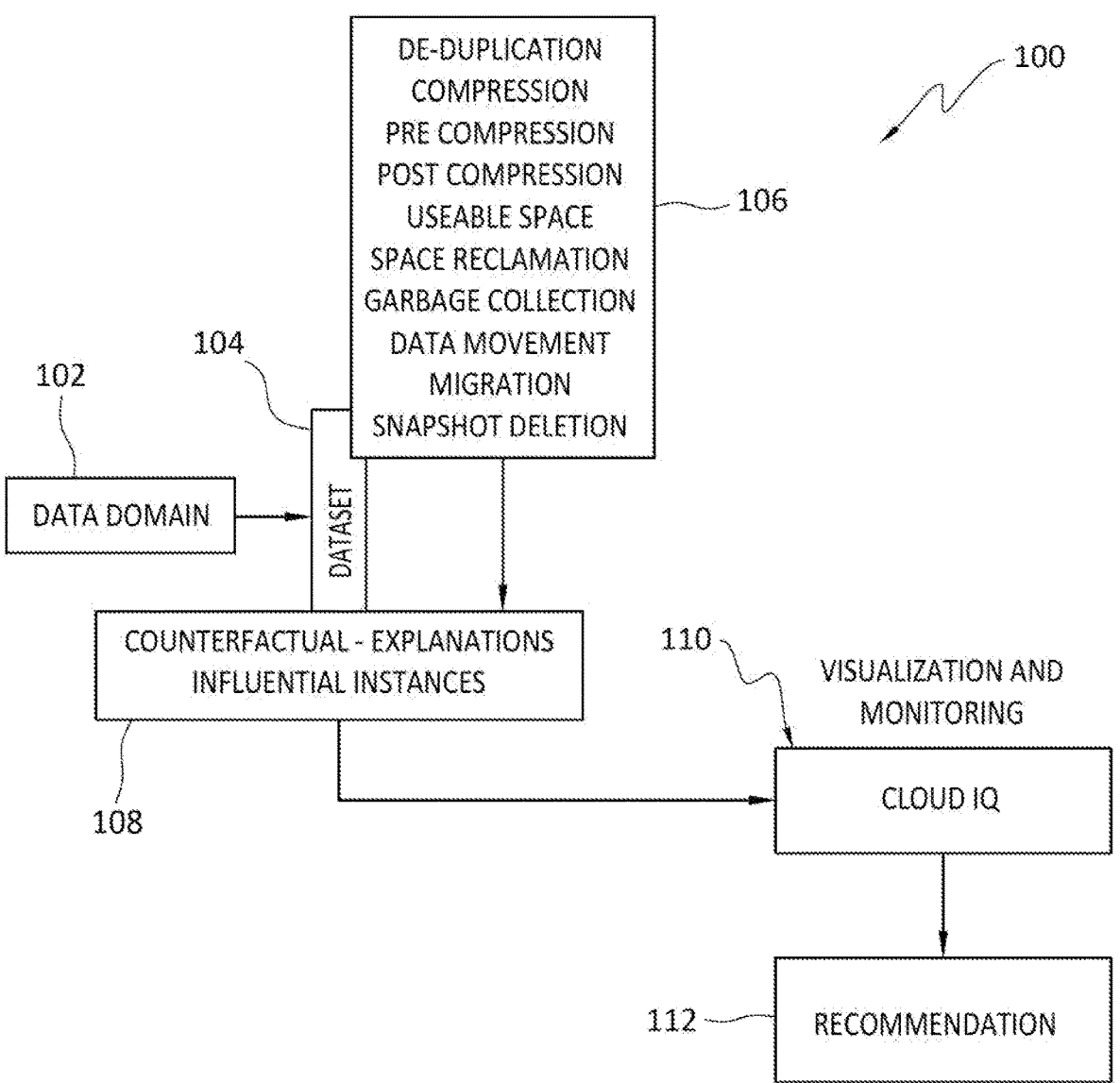
FIG. 1 discloses aspects of an example operating environment and method.

Embodiments of the present invention generally relate to data storage consumption. More particularly, at least some embodiments of the invention relate to systems, hardware, software, computer-readable media, and methods for recommending and implementing various actions concerning data storage assets, based on one or more counterfactual analyses.

In general, example embodiments of the invention embrace the use of model-agnostic counterfactual analyses as a basis for generation of recommendations which, when implemented, may enhance the data protection capabilities of various systems and environments, such as a backup environment for example.

To illustrate, some example embodiments may operate to explain the cause and effect of system behavior over data growth using model-agnostic counterfactual analysis. In one example method, various input parameters may be collected. Input parameters may comprise metadata collected from a dataset, which may or may not be a backup dataset, and/or telemetry concerning factors such as the rate at which data storage space is being consumed. Next, a DAG (directed acyclic graph) (see, e.g., FIG. 3) may be generated for the input parameters using domain knowledge. The input parameters may then be fed to a causal engine for counterfactual analysis (examples of which are disclosed in the '294 Application referred to herein in the Related Applications section), and the output of the causal engine may be used as a basis for generating recommendations as to data protection actions that may be undertaken. These recommendations may be provided, such as by way of a GUI (graphical user interface), to an administrator, or other user, for decision and action.

In more detail, and based on storage space demand forecasting, various actions may be recommended to, and taken by, an administrator for proactive action so as to help ensure, for example, that data protection systems and processes are aligned with the need for business continuity, which may include reliable and ongoing access to business data for example. Such actions may be based, for example, on a determined probability that a storage assets will be full as of a particular time, and/or may be based on a prediction as to when a storage asset will be full. In either case, example embodiments may help to avoid situations in which backup operations, and/or other operations, fail due to a lack of storage space.

One example data protection action that may be taken is to reconfigure an existing backup policy to accommodate the fact that storage space is running out. Such a reconfiguration may comprise changing a full backup process to an incremental backup process. Another example action may be to change the backup schedule so that, for example, backups are taken less frequently. Note that multiple data protection actions may be recommended and implemented in some embodiments. Other example data protection actions include, but are not limited to, load balancing workloads so that the collective capacity of one or more storage assets is consumed more evenly, and slowly. For example, the storage of incoming backup datasets may be distributed to a different backup cluster in the same data protection ecosystem, and/or across multiple backup clusters. As another example of a data protection action, a garbage collection process that deletes expired data, for example, may be prioritized in order to free up storage space. Further, old and/or unneeded dataset snapshots may be deleted. Finally, storage capacity may be expanded by adding new storage assets, such as storage systems and storage devices, to the system.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect (s) or solution(s). Finally, it is not required that any embodiment implement any of the advantageous and unexpected effects disclosed herein.

In particular, one advantageous aspect of at least some embodiments of the invention is that counterfactual analyses may enable the performance of what-if analyses to determine the expected impact of one or more data protection actions on the storage capacity of a data storage asset. As another example, counterfactual analyses may enable the comparison of the respective impacts of various data protection actions on the storage capacity of a data storage asset. In a final example, counterfactual analyses may be used as a basis for generating recommendations as to actions that may be taken to improve the way in which data storage is employed.

It is noted that embodiments of the invention, whether claimed or not, cannot be performed, practically or otherwise, in the mind of a human. Consistent with the illustrative examples disclosed herein, embodiments of the invention are applicable to, and find practical usage in, computing environments in which large numbers, such as millions or billions for example, of bits of data, may be handled and processed by a data management system, data storage system, and/or data deduplication system. Such handling and processing is well beyond the mental capabilities of any human to perform practically, or otherwise. Thus, while other, simplistic, examples may be disclosed herein, those are only for the purpose of illustration and to simplify the discussion, but may not necessarily represent real world applications of embodiments of the invention. Accordingly, nothing herein should be construed as teaching or suggesting that any aspect of any embodiment of the invention could or would be performed, practically or otherwise, in the mind of a human.

A. Aspects of An Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of data management operations which may include, but are not limited to, data read/write/delete operations, data storage operations, garbage collection operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment.

Example cloud computing environments, which may or may not be public, include storage environments that may provide data protection functionality for one or more clients. Another example of a cloud computing environment is one in which processing, data protection, data management, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data, and that data may ultimately be stored, such as in the form of a backup dataset for example, in a data storage environment. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

B. Feature Collection For Counterfactual Analyses

With attention now to FIG. 1, details are provided concerning various aspects of some example embodiments. In general, example embodiments such as are disclosed in FIG. 1 may involve the use of a stochastic-causal algorithm which may implement, among other things: (i) the handling of chaotic time series data considering influential instances; (ii) generation of model-agnostic counterfactual explanation—cause and effect of system behavior over data growth; and (iii) quantification of the probability a given storage array will run out of capacity within a certain time period. The risk of running out of data storage capacity may be calculated for any number of different future time frames. In some instances, there may initially be a lack of awareness as to when a data storage asset will reach full capacity, that is, its ability to store further data is exhausted.

In general, the example configuration 100 in FIG. 1 may be used to generate outputs that can be used as a basis for making one or more recommendations concerning data storage systems and processes. As shown in FIG. 1, embodiments of the invention may be employed in a data storage environment 102, such as the EMC DataDomain environment for example, although no particular operating environment is required for any embodiment. One or more datasets 104 may be generated and/or stored in the data storage environment 102. At least one of the datasets 104 may be a backup dataset.

Various parameters 106 of the data storage environment 102 may be associated with the dataset 104. In general, the parameters 106 may relate to, or comprise, any process or processes that influence, in some way, the consumption of data storage in the data storage environment 102. Some parameters 106 may be relatively more influential than other parameters 106.

The parameters 106 may include, for example, data deduplication, data compression, pre-compression of data prior to storage, post-compression of data after storage, space reclamation garbage collection, data movement, data migration, snapshot deletion, for example. More generally, the parameters 106 may comprise any process, or combination of processes, that exert influence on the use of data storage capacity in the data storage environment 102. For example, a parameter 106 that has a direct or indirect causal relationship with dataset growth and/or data storage consumption may be considered as exerting such an influence.

The processes, or any subset of the processes, associated with the parameters 106 may be performed in a variety of manners. For example, such processes may be performed randomly. As another example, the processes may overlap in time with each other, or may be performed serially, or in parallel. Further, the processes with which the parameters 106 are associated may be performed at various times with respect to the dataset 104, such as during/after data ingestion to the data storage environment 102, and/or while the data is residing in the data storage environment 102. Note that no particular set of parameters 106, nor the manner in which the associated processes are performed, is necessarily employed in connection with any particular embodiment. Further, there may, or may not, be causal relationships between or among two or more processes. Such causal relationships, if any, may be identified by methods disclosed elsewhere herein.

With continued reference to FIG. 1, one or more of the parameters 106 may constitute inputs to a counterfactual analysis process 108, an example of which is discussed in more detail below in connection with FIG. 2. Counterfactual analyses may not necessarily be performed with respect to all parameters 106, but only selected parameters 106, at least in some embodiments. Note that the selected parameters 106 that are input to the counterfactual analysis 108 may vary from one occasion to another, and need not be the same each time an evaluation of the data storage environment 102 is performed.

Some embodiments of the invention may provide for integration of capabilities such as the generation of recommendations for data protection actions into conventional monitoring platforms, such as the DellEMC Cloud ICI platform for example. Thus, in the illustrative example of FIG. 1, the output of the counterfactual analysis 108 may serve as an input to a visualization and monitoring platform/process 110. The visualization and monitoring process may then generate, based on the input received from the counterfactual analysis 108, an output that includes one or more recommendations 112 concerning storage assets of, for example, the data storage environment 102.

C. Example Counterfactual Analyses

Figure 2:
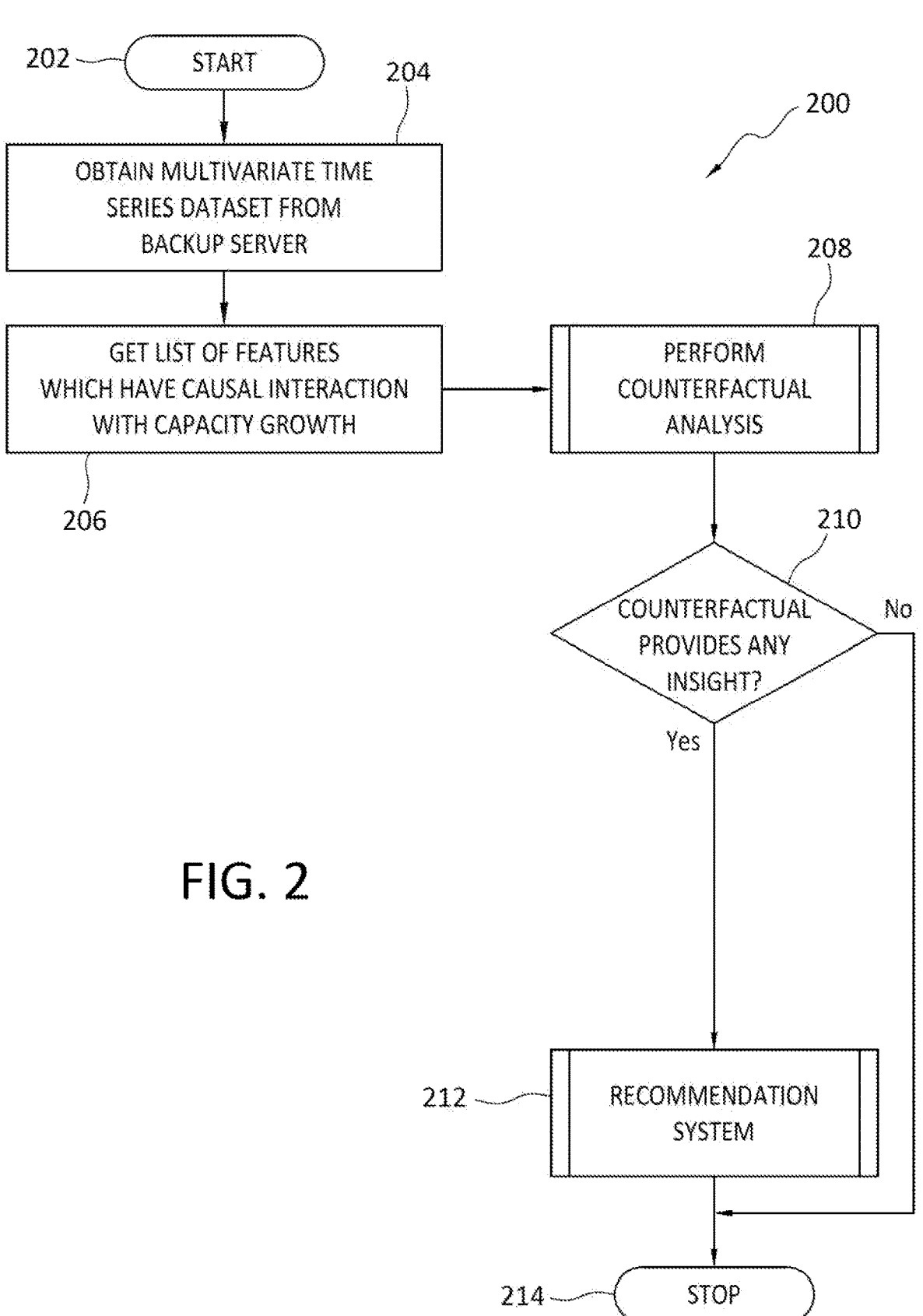
FIG. 2 discloses aspects of an example method for counterfactual analysis.

With reference now to FIG. 2, details are provided concerning an example method 200 for the use of counterfactual analyses in generating recommendations concerning data storage capacity of a data storage system. The method 200 may start at 202 and move to 204 where a multivariate time series dataset may be obtained from an entity such as a backup server. The dataset 104 discussed in connection with FIG. 1 is one example of such a multivariate time series dataset.

From the dataset, and/or processes involving the dataset, one or more features may be extracted 206. One or more of the extracted features may have a causal relationship with each other and/or with the consumption of data storage. Additionally, or alternatively, one or more of the extracted features may have a causal relationship with the growth of the dataset and, thus, the amount of storage capacity needed to hold the dataset. All parameters need not be included in the list. Rather, the list may consist only of those parameters whose causal interaction with one or more other parameters has made a material contribution, as defined by a user for example, to the growth of the dataset.

The extracted features 206 may constitute inputs to a counterfactual analysis process 208, aspects of examples of which are discussed below in connection with FIGS. 3 and 4. If it is determined 210 that the counterfactual analysis 208 provides insight as to, for example, any one or more of (i) the probability that the data storage capacity of a data storage asset will be exhausted in a particular time interval, (ii) a time when data storage capacity is expected to be exhausted, and/or, (iii) the growth of the dataset, such insight(s) may be provided 212 to a recommendation system.

On the other hand, if no useful insights are obtained 210 from the counterfactual analysis 208, the method 200 may terminate 214 after the recommendation system has generated a recommendation. Thus, in the example of FIG. 2, a recommendation system may generate recommendations for one or more data protection actions based in part, or in whole, on insights provided by the counterfactual analysis 208.

D. Aspects of Example Causal Relationships and Counterfactuals

Figure 3:
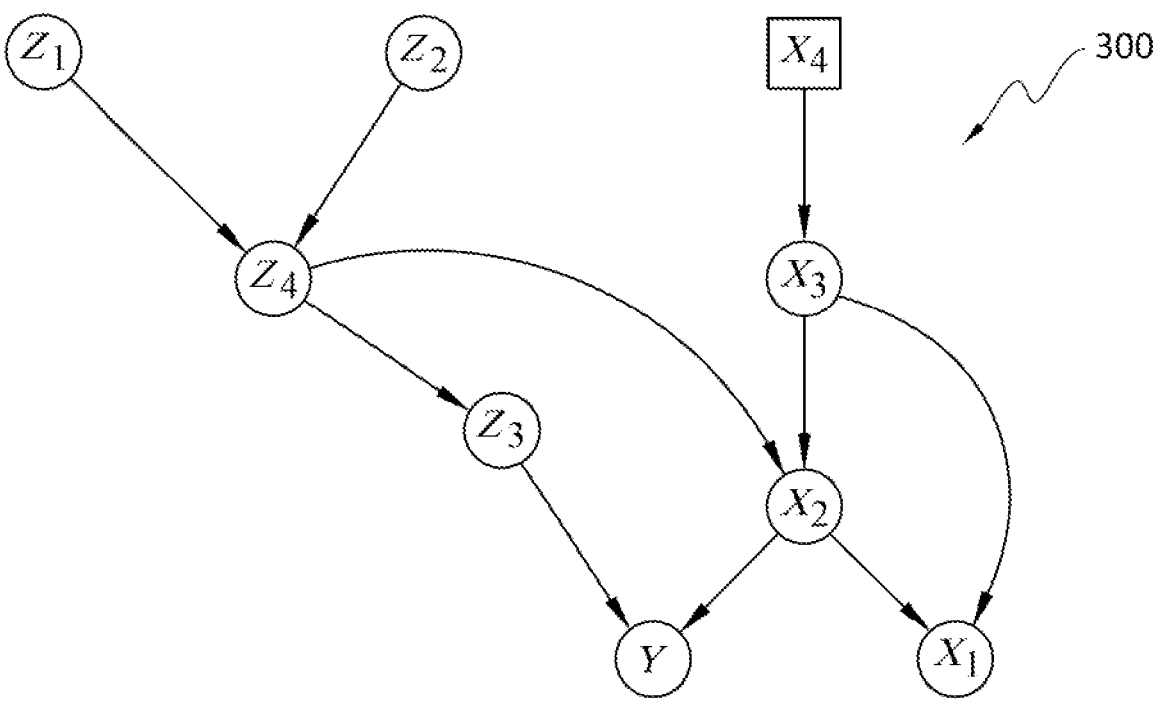
FIG. 3 discloses aspects of dataset parameter causal relationships.
Figure 4:
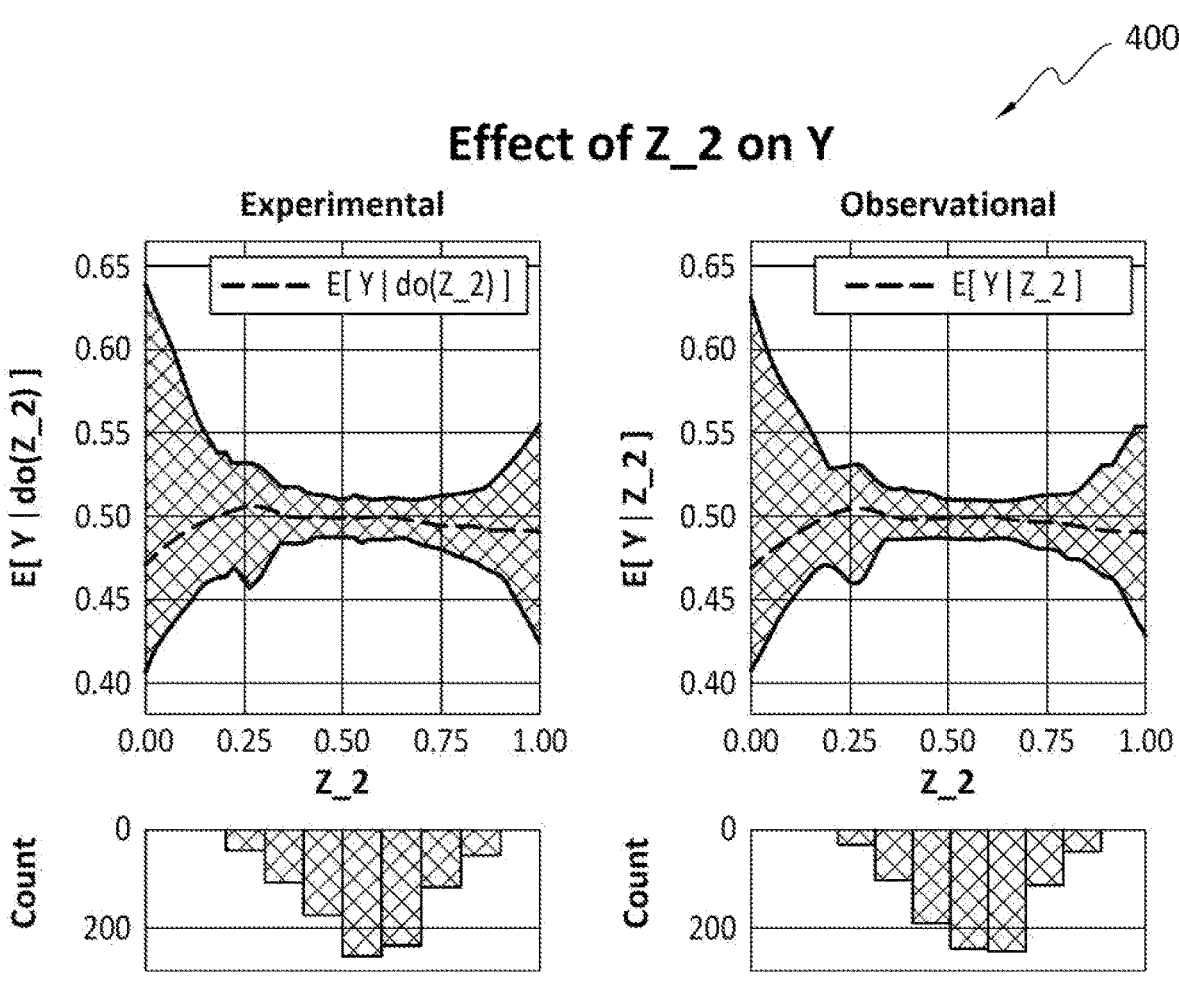
FIG. 4 discloses aspects of the effect of a dataset parameter on another dataset parameter.

Turning next to FIG. 3, details are provided concerning the determination of causal relationships between/among parameters relating to a dataset. In particular, Table 1 below includes an example listing of such attributes, each of which has been designated with an 'Element' identifier. In the example case where an embodiment of the invention is employed in connection with a DataDomain data storage environment, the attributes listed below may be pulled from DataDomain and the auto-support.

TABLE 1

| Elements | Attributes |
|---|---|
| Y | Storage Utilization (%) |
| X1 | Deduplication ratio (numeric) |
| X2 | total_post_compression_used (GB) |
| X3 | Daily precompression (GB) |
| X4 | Workload pattern (types) |
| Z1 | Snapshot deletion (GB) |
| Z2 | Data movement (GB) |
| Z3 | post_compression_used after space reclamation (GB) |
| Z4 | Space reclamation after garbage collection (GB) |

As shown in the example map 300 in FIG. 3, various parameters listed in Table 1 have a causal relationship with one or more other parameters. A parameter may have one or more direct and/or indirect causal relationships with one or more other parameters, and/or with aspects relating to data storage capacity such as, but not limited to, any one or more of (i) the probability that the data storage capacity of a data storage asset will be exhausted in a particular time interval, (ii) a time when data storage capacity is expected to be exhausted, and/or, (iii) the growth of the dataset.

As used herein, a direct causal relationship refers to a relationship such as that between Z2 and Z4, where Z2 directly affects Z4. On the other hand, an indirect causal relationship refers to a relationship such as that between Z4 and Y, where Z4 only indirectly influences Y. Thus, some parameters may exert a relatively greater influence on, for example, storage utilization % (Y) than other parameters do.

To illustrate with some examples, performance of Z1 and Z2 in connection with Z4 causes the performance of Z3. The performance of Z3 and X2, in turn, results in the generation of a value for Y. As another example, the performance of X4 in connection with X3 results in the performance of X2. X1 may result simply from the performance of X3 and/or from performance of X3 and X2. As a final example, X2 may result from Z4 and/or X3. As these examples illustrate, one of the attributes may be dependent upon one or more other attributes, and that one attribute may also cause the performance of other attributes. In an illustrative example, FIG. 4 includes various plots 400 that indicate the effect of Z2 on Y.

Causal relationships may be employed in counterfactual analyses. For example a counterfactual explanation may describe a causal situation in the form: "If X had not occurred, Y would not have occurred." For example, and referring briefly to FIG. 3, it can be seen that if Z4 had not occurred, Z3 would not have occurred.

Such 'what if' scenarios may provide useful insights. Suppose, for example, that x_cf is the counterfactual introduced for x[i], delta is the changes made to the actual data points for x[i], and y_cf is the obtained prediction after counterfactual analysis and it will be compared with the actual prediction. This is shown in Table 2 below.

TABLE 2

| Parameter | Description |
|---|---|
| x [i] | Given data point for analysis |
| x_cf | Counterfactual introduced for x [i] |
| y_cf | Prediction obtained after counterfactual |
| delta | Changes made to actual data point for x [i] |

An illustrative example is shown below. In a first illustrative scenario, and with reference to Table 3 below, suppose that a prediction was a calculated risk score of 93.75, that is, a 93.75 percent probability, of storage running out of capacity in the next 90 days. Calculation of such risk scores may be performed by any suitable methods. Some example methods for risk score calculation are disclosed in the '294 Application, but the scope of the invention is not limited to any particular risk score calculation processes.

With continued reference now to the aforementioned first scenario, a counterfactual analysis may then be performed thus: if data movement (Z2) had been performed, and if a deduplication ratio for the data in storage had been 8.65, then the risk of running out of capacity would have been 82.94 (y_cf), which is lower than the initially determined risk of 93.75. Interpreting the outputs of the counterfactual analysis that are set forth in Table 3, the administrator can look over the data movement policies and try to determine the reason for the low deduplication ratio.

TABLE 3

| | data movement (GB) | snapshot deletion (GB) | garbage collection (GB) | dedupe ratio (%) |
|---|---|---|---|---|
| x_cf | 1700.73 | 2.86 | 14.65 | 12.32 |
| delta | 473.38 | 0.00 | 0.00 | 8.65 |

An administrator may also use the outcome of a counterfactual analysis to identify various actions that may be taken to reduce the risk score, that is, the probability that the data storage asset will be completely filled within a particular time interval. Such actions might include, for example, re-prioritizing the data to be moved in a data movement policy, load balancing the workload by obtaining optimal data placement destinations, and reconfiguring backup and data retention policies.

In the particular example of Table 3, the recommendations, which may be presented to a user by way of a GUI for example, that are generated based on the outputs of the counterfactual analysis are that (i) data movement should be performed to free up storage space, and (ii) the deduplication ratio should be set to 8.65. By performing these data protection actions, the risk of running out of storage capacity may be lowered from the initially determined risk of 93.75 to a risk of only 82.94 (y_cf). One or both of the aforementioned actions (i) and (ii) may be implemented by user selection of those actions, where such selection may take place by way of a GUI for example.

The data protection actions disclosed in Table 3 are presented only by way of example and are not intended to limit the scope of the invention in any way. Other data protection actions that may be taken according to various embodiments of the invention include, but are not limited to, re-prioritizing the data to be moved in data movement policy, load balancing a backup workload by obtaining optimal data placement destination, and reconfiguring backup and/or data retention policies. Actions such as these, and the other data protection actions disclosed herein, may be implemented and remain in force on an ongoing basis, or may be implemented only temporarily for the purposes of performing what-if evaluations. For example, the load balancing could be implemented temporarily to enable a determination as to how the outcome might change with the implementation of load balancing. Some data protection actions may prove relatively more beneficial than others, so that performance of what-if analyses may enable identification of the most effective data protection action, or group of actions.

Other actions that may be recommended, and implemented either temporarily or on an ongoing basis, based on the outcome of a counterfactual analysis may include alteration of backup server operations. Examples of such backup server operations include reconfiguration of backup policies, movement of stored data to a cloud storage site, and performance of garbage collection operations to delete old/unused data. Still other data protection actions that may be recommended, and implemented either temporarily or on an ongoing basis, include preventive measures such as data compression, data deduplication, and snapshot deletion. These may be considered as preventive in the sense that, in some embodiments, they may be performed as, or before, data is ingested to a storage system, such as a backup storage system, before the data is stored.

As will be apparent from this disclosure then, example embodiments of the invention may implement counterfactual analyses and explanations, which may be model-agnostic in the sense that any suitable model may be used to determine a risk that storage capacity will be exhausted, and/or the relative risk that storage capacity will be exhausted by a particular time. The counterfactual analyses may be used to evaluate causes and effects of system behavior on data growth. As noted, embodiments may be employed to define/modify backup schedules, take steps to mitigate the risk of exhausting data storage capacity, and to define/implement optimal plans for the use of data storage capacity.

E. Example Methods

Figure 5:
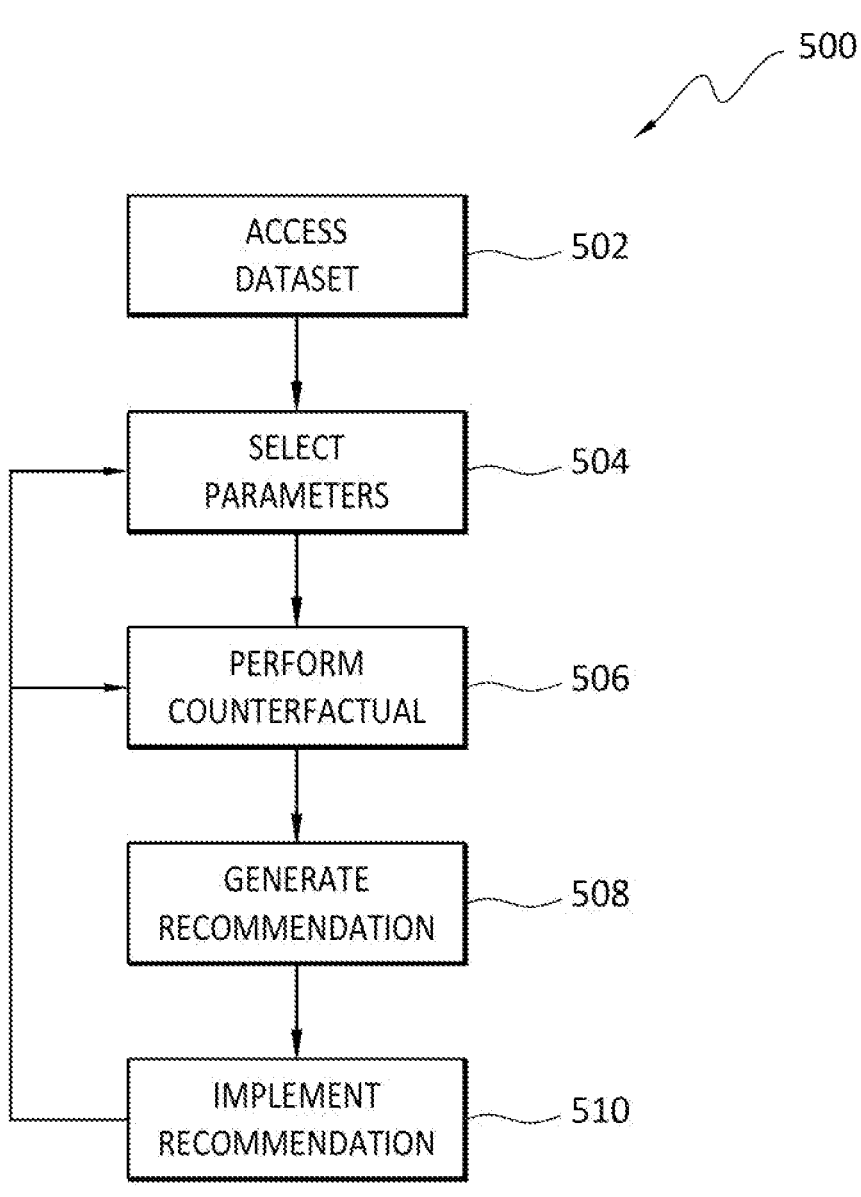
FIG. 5 discloses aspects of an example method.

It is noted with respect to the example method of FIG. 5 that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

Directing attention now to FIG. 5, one example method is denoted at 500 and may begin when a dataset is accessed 502. The dataset may be stored in storage at the time it is accessed 502, although that is not necessarily required. The dataset may not be static in terms of its size and, for example, may be growing or contracting in size.

After the dataset has been accessed 502, one or more parameters of, or associated with, the dataset may be selected 504 that have a causal relationship with each other, with growth of the dataset, and/or, with consumption of storage capacity by the dataset. Any of the causal relationships may be direct or indirect.

One, some, or all, of the selected parameters may then be used as inputs to a counterfactual analysis 506. The output of the counterfactual analysis 506 may be used as a basis for generating a recommendation 508 as to a data protection action, or actions, that should be taken. Among other things, the data protection action may include performance of one or more data management processes, or any other process that may affect consumption of data storage by the dataset.

One or more of the recommended data protection actions may then be implemented 510, on a temporary basis for the performance of what-if analyses, or on an ongoing basis. When the recommended data protection action is implemented as part of a what-if analysis, that data protection action may be undone after completion of the what-if analysis.

Among other things, implementation of the data protection actions may affect the growth of the dataset and the consumption of storage space by the dataset. One or more of the data protection actions may comprise a proactive measure, such as an action that may be performed prior to storage of data of the dataset, and/or may comprise an action performed after the data has been stored in storage.

As further indicated in FIG. 5, aspects of the method 500 may be performed on an ongoing basis. Thus, for example, after a recommendation is implemented 510, the method 500 may return to 504 for selection of new and/or additional parameters. As another example, after a recommendation is implemented 510, the method 500 may return to 506 for performance of one or more additional counterfactuals with the parameters that were selected at 504.

In some embodiments, the method 500 may be performed automatically on an ad-hoc basis or on a recurring basis of some type. The method 500 may additionally, or alternatively, be performed automatically in response to the occurrence of a triggering event, such as when a monitoring system reports that the storage capacity of a data storage asset has reached a defined threshold, such as about 75% full for example.

F. Further Example Embodiments

Following are some further example embodiments of the invention. These are presented only by way of example and are not intended to limit the scope of the invention in any way.

Embodiment 1. A method, comprising: accessing a dataset; selecting a list of parameters of the dataset, each of the parameters being selected based on a determination that the parameter is affecting a size of the dataset and/or affecting an amount of data storage space consumed by the dataset; performing a counterfactual analysis using the parameters, and using results of the counterfactual analysis to generate a recommendation that identifies one or more data protection actions which influence utilization of the data storage space; and modifying utilization of the data storage space by implementing one of the data protection actions.

Embodiment 2. The method as recited in embodiment 1, wherein the dataset is a backup dataset.

Embodiment 3. The method as recited in any of embodiments 1-2, further comprising identifying, for one of the parameters, a causal relationship between that parameter and one of the other parameters.

Embodiment 4. The method as recited in any of embodiments 1-3, further comprising identifying, for one of the parameters, a causal relationship between that parameter and an amount of storage capacity consumed by the dataset.

Embodiment 5. The method as recited in any of embodiments 1-4, further comprising identifying, for one of the parameters, a causal relationship between that parameter and the size of the dataset.

Embodiment 6. The method as recited in any of embodiments 1-5, further comprising generating a directed acyclic graph that identifies a causal relationship between two or more of the parameters.

Embodiment 7. The method as recited in any of embodiments 1-6, wherein the data protection action is implemented before any additional data is added to the dataset.

Embodiment 8. The method as recited in any of embodiments 1-7, wherein the data protection action is implemented on a temporary basis as part of performance of a what-if analysis.

Embodiment 9. The method as recited in any of embodiments 1-8, wherein the recommendation is additionally based on a risk score that indicates an extent to which there is a risk that the data storage space will be exhausted by a particular point in time.

Embodiment 10. The method as recited in any of embodiments 1-9, wherein the implemented data protection action affects either a size of the dataset, or an amount of available storage space.

Embodiment 11. A method for performing any of the operations, methods, or processes, or any portion of any of these, disclosed herein.

Embodiment 12. A computer readable storage medium having stored therein instructions that are executable by one or more hardware processors to perform operations comprising the operations of any one or more of embodiments 1-11.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 6:
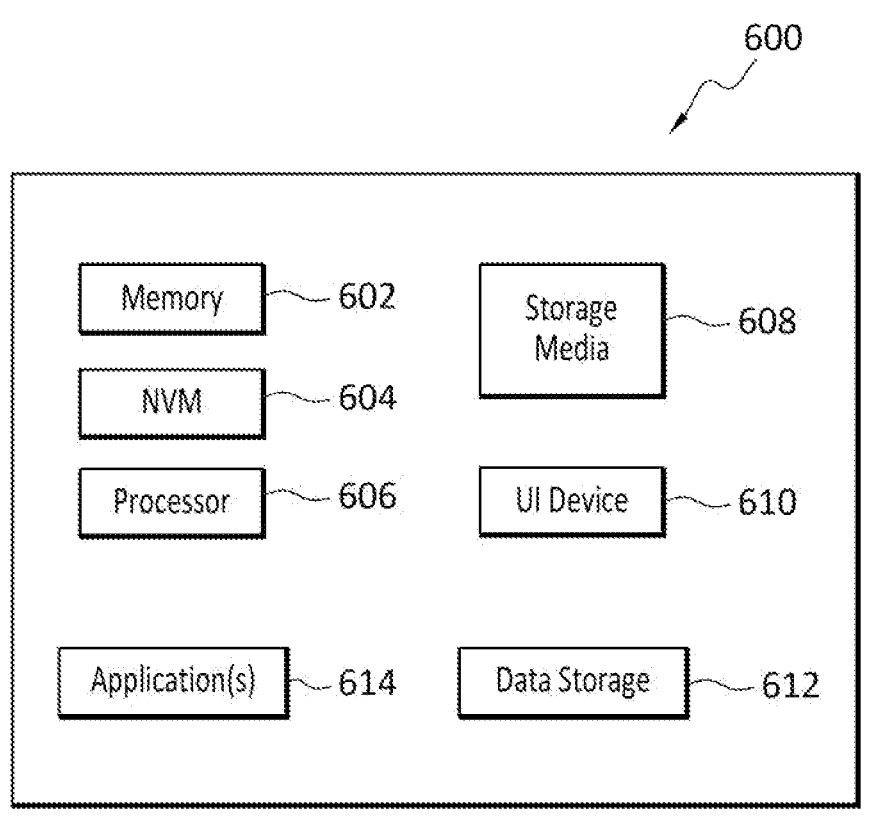
FIG. 6 discloses aspects of an example computing entity configured to perform any of the disclosed methods and processes.

With reference briefly now to FIG. 6, any one or more of the entities disclosed, or implied, by FIGS. 1-5 and/or elsewhere herein, may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 6.

In the example of FIG. 6, the physical computing device 600 includes a memory 602 which may include one, some, or all, of random access memory (RAM), non-volatile memory (NVM) 604 such as NVRAM for example, read-only memory (ROM), and persistent memory, one or more hardware processors 606, non-transitory storage media 608, UI device 610, and data storage 612. One or more of the memory components 602 of the physical computing device 600 may take the form of solid state device (SSD) storage. As well, one or more applications 614 may be provided that comprise instructions executable by one or more hardware processors 606 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for managing utilization of a data storage space so as to reduce a risk of capacity exhaustion for the data storage space, the method comprising:

accessing a dataset;

selecting a list of parameters of the dataset, each parameter in the list of parameters related to a growth of the dataset, wherein one of the parameters of the list of parameters is related to data deduplication operations;

generating a directed acyclic graph that identifies a causal relationship among the parameters in the list of parameters of the dataset based on a storage utilization and a deduplication ratio of the dataset;

performing a counterfactual analysis based on the directed acyclic graph identifying the causal relationship among the parameters, which include a total_post_compression_used amount, a daily precompression, a workload pattern, a snapshot deletion, a data movement, a post_compression_used after space reclamation, and a space reclamation after garbage collection;

using results of the counterfactual analysis to generate a recommendation that identifies one or more data protection actions which influence utilization of a data storage space;

displaying the recommendation that identifies the one or more data protection actions as one or more user interface elements on a graphical user interface; and modifying utilization of the data storage space by implementing one of the data protection actions, wherein implementing the one data protection action includes performing at least one of:

reconfiguring an existing backup policy, changing an existing backup schedule, load balancing current workloads, deleting existing dataset snapshots that are determined to be unneeded, performing a garbage collection process to delete expired data, or expanding existing storage capacity.

2. The method as recited in claim 1, wherein the dataset is a backup dataset.

3. The method as recited in claim 1, further comprising identifying, for one of the list of parameters, a causal relationship between the one parameter and the others in the list of parameters.

4. The method as recited in claim 1, further comprising identifying, for one of the parameters, a causal relationship between the one parameter and an amount of storage capacity consumed by the dataset.

5. The method as recited in claim 1, further comprising identifying, for one of the parameters, a causal relationship between the one parameter and the size of the dataset.

6. The method as recited in claim 1, wherein the data protection action is implemented before any additional data is added to the dataset.

7. The method as recited in claim 1, wherein the data protection action is implemented on a temporary basis as part of performance of a what-if analysis.

8. The method as recited in claim 1, wherein the recommendation is additionally based on a risk score that indicates an extent to which there is a risk that the data storage space will be exhausted by a particular point in time.

9. The method as recited in claim 1, wherein the implemented data protection action affects either a size of the dataset, or an amount of available storage space.

10. A non-transitory computer readable storage medium having stored therein instructions that are executable by one or more hardware processors to perform operations for managing utilization of a data storage space, the operations comprising:

accessing a dataset;

selecting a list of parameters of the dataset, each parameter in the list of parameters related to a growth of the dataset, wherein one of the parameters of the list of parameters is related to data deduplication operations;

generating a directed acyclic graph that identifies a causal relationship among the parameters in the list of parameters of the dataset based on a storage utilization and a deduplication ratio of the dataset;

performing a counterfactual analysis based on the directed acyclic graph identifying the causal relationship among the parameters, which include a total_post_compression_used amount, a daily precompression, a workload pattern, a snapshot deletion, a data movement, a post_compression_used after space reclamation, and a space reclamation after garbage collection;

using results of the counterfactual analysis to generate a recommendation that identifies one or more data protection actions which influence utilization of a data storage space;

displaying the recommendation that identifies the one or more data protection actions as one or more user interface elements on a graphical user interface; and modifying utilization of the data storage space by implementing one of the data protection actions, wherein implementing the one data protection action includes performing at least one of:

reconfiguring an existing backup policy, changing an existing backup schedule, load balancing current workloads, deleting existing dataset snapshots that are determined to be unneeded, performing a garbage collection process to delete expired data, or expanding existing storage capacity.

11. The non-transitory computer readable storage medium as recited in claim 10, wherein the dataset is a backup dataset.

12. The non-transitory computer readable storage medium as recited in claim 10, wherein the operations further comprise identifying, for one of the list of parameters, a causal relationship between the one parameter and the others in the list of parameters.

13. The non-transitory computer readable storage medium as recited in claim 10, wherein the operations further comprise identifying, for one of the parameters, a causal relationship between the one parameter and an amount of storage capacity consumed by the dataset.

14. The non-transitory computer readable storage medium as recited in claim 10, wherein the operations further comprise identifying, for one of the parameters, a causal relationship between the one parameter and the size of the dataset.

15. The non-transitory computer readable storage medium as recited in claim 10, wherein the data protection action is implemented before any additional data is added to the dataset.

16. The non-transitory computer readable storage medium as recited in claim 10, wherein the data protection action is implemented on a temporary basis as part of performance of a what-if analysis.

17. The non-transitory computer readable storage medium as recited in claim 10, wherein the recommendation is additionally based on a risk score that indicates an extent to which there is a risk that the data storage space will be exhausted by a particular point in time.

18. The non-transitory computer readable storage medium as recited in claim 10, wherein the implemented data protection action affects either a size of the dataset, or an amount of available storage space.

* * * * *